June 1, 1965     E. R. DUGAS     3,186,260

AUTOMATIC INDEXING DEVICE

Filed Jan. 30, 1961     2 Sheets-Sheet 1

INVENTOR
Eddy R. Dugas

BY
ATTORNEYS

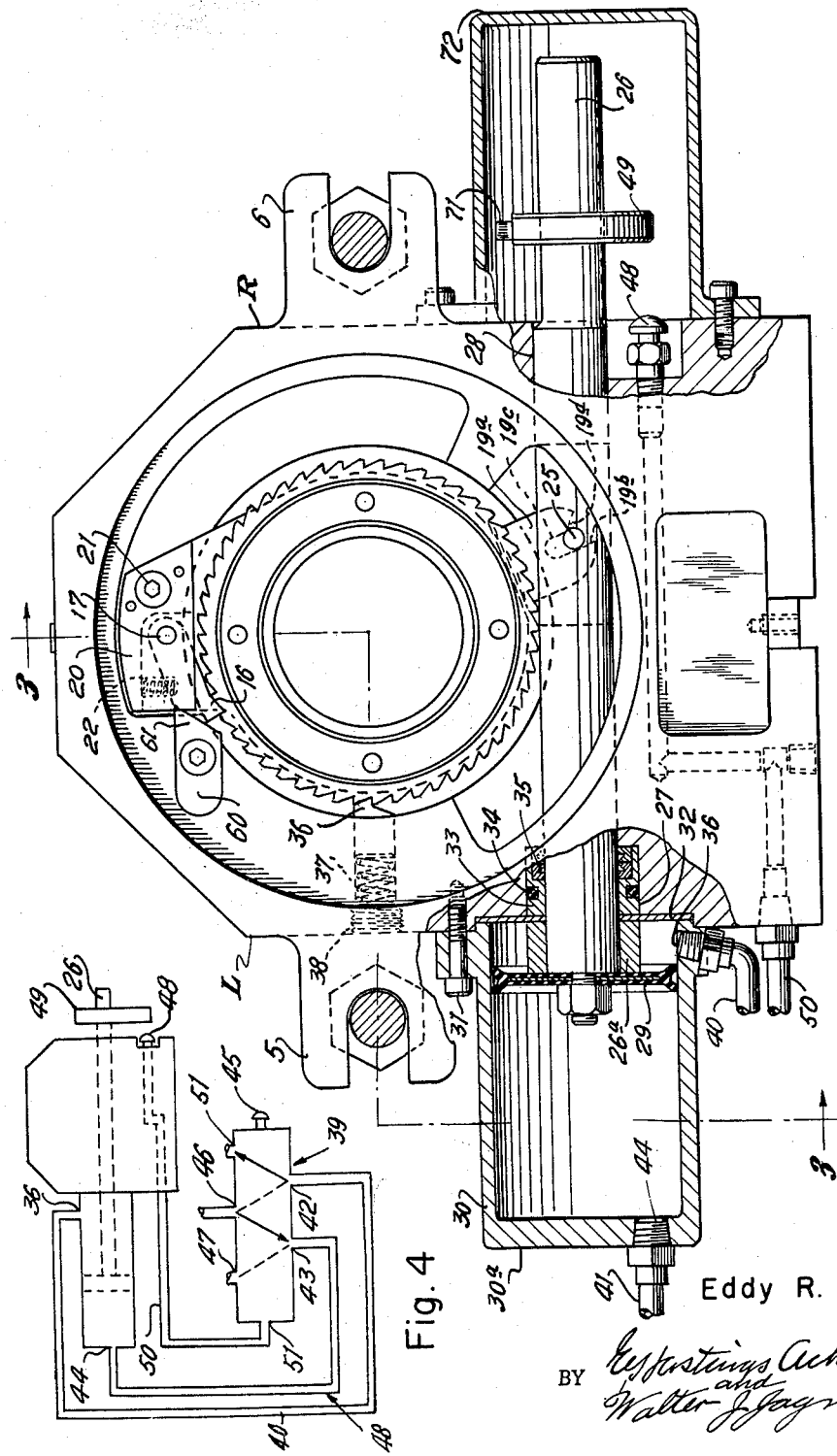

United States Patent Office 3,186,260
Patented June 1, 1965

3,186,260
AUTOMATIC INDEXING DEVICE
Eddy R. Dugas, 617 Yuma Court, Dallas, Tex.
Filed Jan. 30, 1961, Ser. No. 85,800
6 Claims. (Cl. 74—822)

This invention relates to an automatic indexing device, and more particularly to a pneumatically operated device for indexing work pieces about an axis.

An object of this invention is to provide a rapid and accurate automatically operated indexing device.

Another object is to provide a pneumatically operated automatic tool for rotating a chuck in predetermined angles about an axis by a series of steps whereby a workpiece carried by the chuck may be rapidly and accurately indexed for performing machining operations or the like thereon.

Still another object is to provide a device powered by pneumatic means which may be automatically operated for rotating a chuck supported by the device in steps of a predetermined angular unit and which angular unit of rotation may be readily adjusted by adjustment of the device.

A further object is to provide a spindle rotatably journalled within a housing, means for securing a chuck to the spindle whereby a workpiece supported thereon may be rotated about the rotary axis of said spindle, an air powered mechanism for rotating the spindle and chuck in a series of steps of a preselected angular unit, and means for adjusting the size of the angular unit.

A still further object is to provide an automatic air powered indexing device useful in indexing workpieces about an axis for performing machining operations or the like thereon and which device may be rigidly attached to a stationary object in either of two rectangularly oriented positions.

Another object is to provide an indexing device comprising spindle means for rotating a workpiece holding chuck about an axis, ratchet and pawl means for turning the spindle and chuck by a predetermined angular unit, and a pneumatic powered mechanism for imparting reciprocatory motion to the pawl of said ratchet and pawl means and which mechanism may be operated automatically to thereby turn the spindle and chuck by a series of steps and allow for rapid indexing of spacings on a workpiece.

Still another object is to provide an indexing device comprising spindle means for rotating a workpiece holding chuck about an axis, ratchet and pawl means for turning the spindle and chuck by a predetermined angular unit, a pneumatic powered mechanism for imparting reciprocatory motion to the pawl of said ratchet and pawl means, and a locking means for locking the spindle and chuck against rotation except when actuated by the pneumatic powered mechanism to turn to a new position.

Additional objects and advantages of the invention will be readily apparent from the following description of a device constructed in accordance with the invention, and with reference to the accompanying drawings thereof, wherein:

FIGURE 2 is a fragmentary view of the back of the device showing the air cylinder and piston rod cover housing in vertical section;

FIGURE 4 is a schematic diagram illustrating the connections of the 4-way valve with the indexing device.

Figure 1:
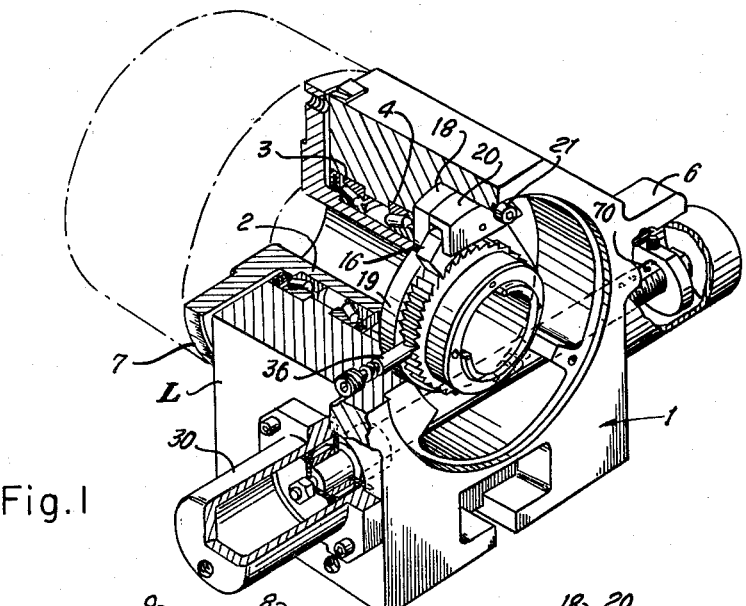
FIGURE 1 is a fragmentary isometric view of the indexing device showing the housing and spindle in partial vertical and horizontal sections co-planar with the spindle axis and partial sectional views of the air cylinder in vertical and horizontal sections through the longitudinal axis of the plunger.
Figure 3:
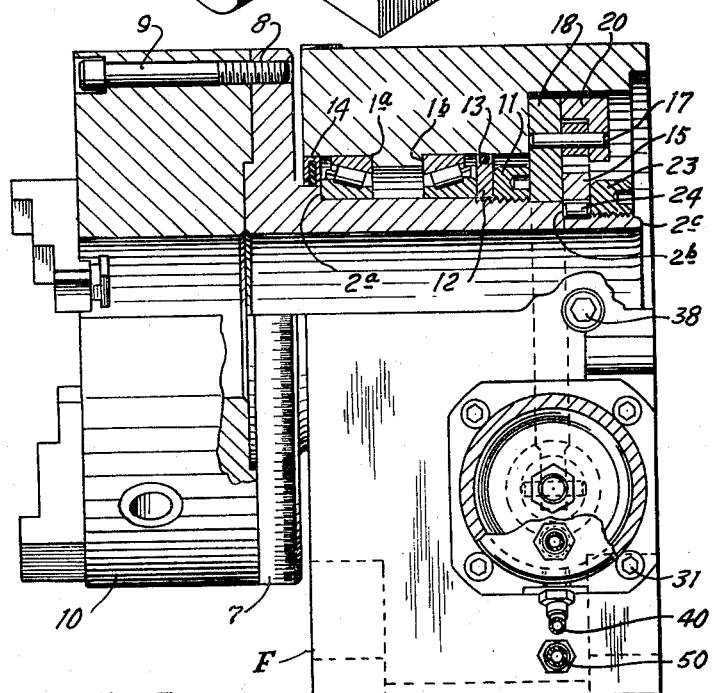
FIGURE 3 is a side view of the device taken along lines 3—3 of FIGURE 2 and further showing a chuck secured in normal operating position on the device.

Referring to the drawing, the device embodying the invention includes a housing 1 in which a rotatable hollow spindle 2 is journalled on roller bearing assemblies 3 and 4 within a spindle accommodating bore in the housing. The base and back of the housing are machined parallel and square with the spindle so that mounting the device in either vertical or horizontal position is easily accomplished. Yoke members 5 and 6 are integral with the side walls L and R of the housing and extend co-planar with the back of the housing whereby bolts may be inserted in the yoke members for affixing the housing to any suitable supporting structure. An indexing plate 7 upon which a chuck may be mounted is integrally formed with the spindle 2 and extends perpendicularly to the longitudinal axis of the spindle. The indexing plate is formed at the end of the spindle which extends through the front of the housing such that the indexing plate is adapted to rotate in a plane parallel to the front of the housing and closely adjacent thereto. The plate is provided with threaded bore holes 8 for accommodating the mounting bolts 9 of a chuck 10. While a standard three jaw chuck is illustrated in the drawings, other workpiece holding devices such as a two jaw chuck, six jaw chuck, collet chuck, or large table for special work can be mounted on the indexing plate 7 as desired.

The spindle is journalled in the spindle accommodating bore in the housing by means of the annular roller bearing assemblies 3 an 4 mounted on the spindle and concentric therewith. The roller bearing assembly 3 abuts the spindle shoulder 2a which extends radially with respect to the spindle axis and also abuts the internal shoulder 1a of the housing, which shoulder extends perpendicularly to the spindle axis. The roller bearing assembly 4 is locked against the shoulder 1b of the housing by means of a lock nut or ring 11 threaded on the spindle. A bearing ring 12 is interposed between the roller bearing assembly 4 and the lock ring and is provided with an annular recess in its circumferential periphery for accommodating an O-ring 13 in a fluid sealing relationship with the wall of the spindle accommodating bore. Another sealing means between the spindle and bore wall comprises an annular ring 14 mounted on the spindle and substantially co-planar with the front wall F of the housing. The O-ring and sealing ring 14 permit retention of bearing lubricant in the spindle accommodating bore of the housing. Thus, it will be seen that the spindle is firmly secured within the housing and is rotatably mounted therein.

The mechanism for rotating the spindle includes an annular ratchet gear 15 attached to the end of the spindle remote from the indexing plate. The gear is arranged concentric with the spindle and rotary movement of the gear is effected by means of the pawl 16 pivotally mounted by a pivot pin 17 attached to an upward extension 18 of an annular plate 19 which is rotatably mounted on the spindle. The pivot pin is received in aligned bores of the extension 18 and a bracket 20 rigidly secured to the extension by a bolt 21. The pawl is spring biased downwardly against the teeth of the ratchet gear by means of a coil spring 22 having one end fastened to the top of the pawl and the other end attached to the underside of the bracket 20 which extends over the pawl.

The annular ratchet gear is fitted on a reduced diameter portion of the spindle extending from the spindle shoulder 2b to the spindle end 2c. The gear is placed on the spindle to abut the spindle shoulder 2b and is locked thereagainst by a locking ring 23 threaded on the spindle at the spindle end 2c so that the gear is prevented from movement in an axial direction of the spindle. Rotation of the ratchet gear on the spindle is prevented by a locking pin or tongue 24 which extends into aligned recesses in the spindle surface and the inner wall of the annular gear. The annular plate 19 is rotatably mounted on the spindle and is fitted on the spindle to abut the roller bearing lock ring 11 and the internal shoulder 1c of the housing which is provided by an enlargement of the spindle accommodating bore. The rear face of the plate 19 is substantially co-planar with the spindle shoulder 2b and thus the plate is rotatably mounted on the spindle between the lock ring 11 and the ratchet gear 15 to which it is adjacent.

Rotary movement of the plate 19 is effected by means of a pin 25 which engages in a yoke 19a formed as a radial extension of the plate. The pin is mounted on a reciprocating rod 26 and when moved therewith acts on the cam surface 19b or 19c of the yoke to effect movement of the plate in either a clockwise or counter clockwise direction as viewed in FIGURE 2. The reciprocating rod is slidably mounted in transverse bores 27 and 28 of the side walls L and R of the housing, which bores communicate with the spindle accommodating bore. A piston 29 attached to one end of the rod is movable in a cylinder 30 attached to the side wall L of the housing by means of bolts 31. The end of the cylinder attached to the housing and which accommodates entry of the rod 26 is in an air seal relationship with the housing due to the interposition of the retainer ring 32 which acts as a gasket. The rod which is slidable in the transverse bore 27 of the housing wall is also mounted in an air seal relationship therewith. A bearing ring 33 is provided in the bore 27 and has external and internal annular recesses for accommodating an O-ring 34 and sealing rings 35, respectively. The O-ring provides an effective air seal between the bearing and housing and the sealing rings provide an effective air seal between the bearing and the rod. The end of the cylinder which is remote from the housing wall is closed by an integral transverse portion 30a. A spacer member 26a is attached to the left end of the rod 26 so as to abut the piston 29. The spacer member may be attached in place on the rod by any suitable means such, for example, as by a set screw or by being press fitted thereon. The spacer member limits the movement of the piston and rod to the right and is of a dimension to insure that the piston will always be to the left of the port 36 in the wall of the cylinder 30 as viewed in FIGURE 2.

Reciprocation of the rod is effected by introduction of air under pressure into the cylinder on opposite sides of the piston and in a manner to alternately apply high pressure to the opposing sides. The port 36 in the cylinder adjacent the end thereof which is attached to the housing permits introduction of air under pressure into the cylinder to move the piston to the left in FIGURE 2. Actuation of the piston to the left with the accompanying movement to the left of the rod and pin 25 results in clockwise rotary movement of the yoke 19a and plate 19 as seen in FIGURE 2 because of the action of the pin against the cam surface 19b of the yoke. The pawl 16 attached to the plate 19 also moves clockwise over the teeth of the ratchet gear, the gear being held against rotation in this direction by a spring pressed catch 36a slidably mounted in a transverse bore in the side wall L of the housing. A coil spring 37 is enclosed within the transverse bore with one end abutting a threaded cap 38 and the other end abutting the catch 36a so that the catch is resiliently biased inwardly against the teeth of the ratchet gear. The gear teeth engaging portion of the catch is designed to permit counter clockwise movement of the gear as viewed in FIGURE 2, but does not permit clockwise movement thereof.

The introduction of air into the cylinder on opposite sides of the piston is controlled by means of a four-way valve 39 of the type now commercially available under the name "Modernair," Model BV4–2020. Conduits 40 and 41 are connected to the valve 39 at ports 42 and 43, respectively, and to the cylinder at ports 36 and 44, respectively, thereby establishing fluid communication between the valve and cylinder. By means of a button 45 the valve is actuated to a first position wherein a compressed air inlet 46 communicates with the port 42 to admit compressed air from a source of air pressure to the cylinder 30 through the conduit 40 and the cylinder port 36. Also, in this position of the valve, the valve port 43 is sealed off from the air inlet 46 but is in communication with the valve exhaust port 47 whereby as the piston rod 26 is driven to the left in FIGURE 2, the air in the cylinder to the left of the piston is exhausted through the port 44, the conduit 41, valve port 43, and valve exhaust port 47. Movement of the rod back to the right is initiated by operation of a button valve 48 mounted in a transverse bore in the side wall R of the housing. The button valve is positioned to be actuated by a stop collar 49 attached exteriorly of the housing 1 to the screw-threaded right end portion of the rod. As the rod moves to the left in FIGURE 2, the stop collar engages the button valve 48 which is in fluid communication with the valve 39 by means of a conduit 50 and valve port 51. Operation of the button valve 48 actuates the valve 39 to move to a second position wherein fluid communication is established between valve ports 46 and 43 to introduce compressed air into the cylinder by means of conduit 41 and cylinder port 44. Also in this position, fluid communication is disestablished between valve ports 46 and 42 but communication between valve port 42 and exhaust port 51 is established to permit exhaustion of air through the cylinder port 36 as the piston is driven back to the right as viewed in FIG. 2. It is apparent that alternate introduction of air on the respective sides of the piston 22 results from actuation of the valve buttons 45 and 48. While the valve button 45 may be pushed manually to initiate a cycle of reciprocatory motion of the rod, any automatic means or timer unit may be employed to actuate the button 45 thereby establishing automatic reciprocation of the rod 26 and complete automatic operation of the device. The four-way valve may be attached, if desired, to an exterior wall of the housing thereby providing for a compact unit of relatively small size.

It is seen that air introduced into the cylinder 30 through the cylinder port 44 moves the piston and rod to the right. As the rod pin 25 also moves to the right, the rotary plate and pawl are driven in a counter clockwise direction by action of the pin against the cam surface 19c of the yoke, so that the pawl moves the ratchet gear in a counter-clockwise direction likewise. Movement of the gear is limited by engagement of the pawl with a stop member 60 fastened to the housing shoulder 1c. The wedge face 61 of the stop engages and holds the free end of the pawl so that any force urging the gear in counter-clockwise movement only clamps the wedge pawl tighter against the gear teeth to oppose such movement. Clockwise movement of the ratchet gear is likewise prevented by the spring pressed catch 36a, described above. However, to further insure against "chattering" of the ratchet gear and rotary plate, the cam surface 19c of the yoke includes a beveled portion 19d upon which the pin 25 exerts a camming action during the end portion of its movement to the right. The action of the pin against the beveled surface tends to prevent "chattering" because of the oblique or angular application of forces between the pin and yoke. Thus, it will be seen that reciprocatory movement of the plunger results in oscillatory movement of the pawl, first in clockwise and then in counter-clockwise direction as viewed in FIG. 2, with step movements of the ratchet gear in the counter-clockwise direction only. Since the spindle and chuck are immovably attached to the ratchet gear, the chuck also moves in correspondence with the ratchet gear so as to be turned by a series of steps in only one direction of rotary movement. Each step in the rotation of the chuck results from a single cycle of reciprocatory movement of the plunger.

The amount of angular movement of the ratchet gear by the pawl is limited by the amplitude of reciprocatory movement of the rod. The stop collar 49 is adjustably mounted on the right end of the rod as seen in FIGURES 1 and 2 and engages the valve release button 48 to halt movement of the piston rod to the left. Thus, it will be seen that the position of the stop collar along the longitudinal axis of the piston rod determines the amplitude of reciprocatory movement of the rod and the amount of angular movement of the chuck.

As shown in FIG. 1, a plurality of indentations 70 may be provided in a flat portion of the screw-threaded end of the piston rod to provide for ready positioning of the stop collar thereon. A set screw 71 is threaded in a bore of the stop collar which extends radially with respect to the longitudinal axis of the rod. The stop collar may be placed in a selected position on the rod by sliding the collar over a particular indentation and screwing the set screw in the indentation. The indentations may be spaced at suitable locations in the piston rod to provide for a standard spacing of the divisions of the circular arc through which the work is rotated when held by the chuck. The screw-threaded end of the piston rod with the attached stop collar is enclosed by a cover 72 which may be bolted to the side wall R of the housing. The cover is of sufficient dimensions to allow for the greatest amplitude of sliding movement of the piston rod 26 and is readily removable to allow for adjustment of the stop collar along the length of the rod.

The construction of the apparatus is designed for long wear and trouble-free operation. The housing body is made from meehanite casting and all working parts are made of alloy and tool steel heat treated for long wear. When the fixture is bolted to a supporting wall or the like, the mechanism is totally enclosed to keep out foreign matter. The locking mechanism for the ratchet wheel and spindle being entirely mechanical is independent of the air supply, therefore the spindle will remain locked at all times except when actuated by the air powered reciprocating piston rod to advance to a new position.

It will now be seen that the apparatus described constitutes a pneumatic operated indexing fixture. By use of a time unit or the like to actuate the valve button 45, completely automatic operation of the device is readily attainable. In automatic operation, the device has indexed 24 divisions in 12 seconds or 7,200 times per hour.

It will also be seen that the device provides for readily obtaining spaced divisions on a workpiece by simply adjusting the position of the stop collar on the plunger and therefore the length of the stroke thereof. The apparatus is designed to cooperate with the standard 48 division indexing plate to allow the following spacing: 2, 3, 4, 6, 8, 12, 16, 24, and 48. However, it is apparent that other spacings may be obtained with special plates.

It will further be seen that the device described herein is an air-powered device particularly adaptable for milling slots, keyways, notches, flutes, etc., in workpieces held by a chuck wherever spacing is required, and can also be used with a drill press for drilling and tapping operations on workpieces.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. An indexing device comprising a support; a spindle rotatably journalled in said support; means mounted on said spindle for holding a workpiece; a ratchet wheel non-rotatably fixed to said spindle and co-axial therewith; a driving member mounted on said spindle for oscillatory movement about the axis of the spindle; a pawl attached to said driving member in operative engagement with said ratchet wheel whereby movement of the driving member on the spindle in one direction will cause the pawl to rotate the ratchet wheel whereby movement of the driving member on the spindle in one direction will cause the pawl to rotate the ratchet wheel therewith and movement of the driving member on the spindle in a second direction opposite said one direction permits said ratchet wheel to remain stationary relative to said driving member; means on said support preventing rotation of said ratchet wheel in said second direction; a rod slidably mounted in said support; first cooperable means on said rod and said driving member for causing said driving member to move in said one direction upon movement of said rod in one axial direction and for causing said driving member to move in said second direction upon movement of said rod in a second axial direction opposite to said one axial direction; means for imparting reciprocatory axial movement to said rod whereby oscillatory motion may be imparted to said driving member to turn the ratchet wheel and spindle in said one direction by a series of steps; a stop member rigid on said support engageable with said pawl for limiting movement of the pawl and said driving member in said one direction of movement; and second cooperable means on the stop member and the pawl for causing the pawl to wedge against the ratchet wheel when urged into engagement with said stop member to lock said ratchet wheel against further rotation in said one direction.

2. The indexing device of claim 1 wherein said first cooperable means comprising a yoke member on said driving member and a pin on said rod extending within said yoke member for drivingly engaging said rotary driving member, said yoke member having means cooperating with said pin urging said driving member toward said stop member when said pawl is in engagement with said stop member and said rod is biased in said one axial direction tending to rotate said driving means in said one direction to increase the force exerted on the pawl by said second cooperable means wedging the pawl against the ratchet wheel.

3. The indexing device of claim 2 and stop means adjustably mounted on said rod coengageable with said support for adjustably limiting the movement of the rod in said second axial direction, said stop means controlling the degree of rotation of said ratchet wheel in said one direction in each cycle of reciprocating movement of said rod.

4. The indexing device of claim 1: and stop means adjustably mounted on said rod engageable with said support for limiting the movement of the rod in said second axial direction, said stop means controlling the degree of rotation of said ratchet wheel in said one direction in each cycle of reciprocating movement of said rod.

5. The indexing device of claim 4: wherein said means for imparting reciprocatory axial movement to said rod comprises a cylinder; a piston secured to one end of said rod and slidable in said cylinder and means operatively associated with said cylinder for alternately communicating said cylinder on opposite sides of said piston with a source of fluid under pressure and the atmosphere thereby imparting reciprocatory motion to said rod; and wherein said stop means includes a means adjustably mounted on a portion of said rod remote from said piston.

6. The indexing device of claim 2 wherein: said means for imparting reciprocatory axial movement to said rod comprises a cylinder; a piston secured to one end of said rod and slidable in said cylinder and means operatively associated with said cylinder for alternately communicating said cylinder on opposite sides of said piston with a source of fluid under pressure and the atmosphere thereby imparting reciprocatory motion to said rod, and wherein said stop means includes a means adjustably mounted on a portion of said rod remote from said piston.

References Cited by the Examiner
UNITED STATES PATENTS

| | | | |
|---|---|---|---|
| 1,526,025 | 2/25 | Street | 74—128 XR |
| 2,029,634 | 2/36 | Peter | 74—128 |
| 2,600,960 | 6/52 | Benjamin | 74—822 |
| 2,883,886 | 4/59 | Benjamin | 74—822 XR |
| 2,915,921 | 12/59 | Scholin et al. | 74—822 XR |
| 2,924,127 | 2/60 | Johnson | 74—822 |
| 3,049,338 | 8/62 | Beebe | 74—575 XR |

BROUGHTON G. DURHAM, *Primary Examiner.*

DON A. WAITE, *Examiner.*